(12) United States Patent
Huang

(10) Patent No.: US 8,388,254 B2
(45) Date of Patent: Mar. 5, 2013

(54) ADJUSTABLE POSITIONING STRUCTURE OF A SHAFT MEMBER

(75) Inventor: Chin-Sung Huang, Changhuwa Hsien (TW)

(73) Assignee: Taiwan Bike Rack Co., Ltd., Changhuwa Hsien (TW)

( * ) Notice: Subject to any disclaimer, the term of this patent is extended or adjusted under 35 U.S.C. 154(b) by 170 days.

(21) Appl. No.: 12/913,859

(22) Filed: Oct. 28, 2010

(65) Prior Publication Data

US 2012/0107037 A1 May 3, 2012

(51) Int. Cl.
 *F16B 7/10* (2006.01)
(52) U.S. Cl. .................................. 403/109.1; 403/109.3
(58) Field of Classification Search .... 403/109.1–109.3, 403/330
See application file for complete search history.

(56) References Cited

U.S. PATENT DOCUMENTS

| | | | | |
|---|---|---|---|---|
| 1,542,335 A | * | 6/1925 | Cardarelli | 285/81 |
| 3,704,850 A | * | 12/1972 | Hendrickson et al. | 248/188.5 |
| 4,079,965 A | * | 3/1978 | Moughty et al. | 285/7 |
| 4,586,399 A | * | 5/1986 | Kassai | 74/551.3 |
| D315,286 S | * | 3/1991 | Graves | D8/331 |
| 5,027,674 A | * | 7/1991 | Nolte et al. | 74/493 |
| 5,525,000 A | * | 6/1996 | Belobraydich et al. | 403/102 |
| 6,032,914 A | * | 3/2000 | Bastida | 248/354.1 |
| D446,440 S | * | 8/2001 | Webber et al. | D8/331 |
| 6,347,777 B1 | * | 2/2002 | Webber et al. | 248/354.1 |
| 6,435,754 B1 | * | 8/2002 | Canale | 403/109.2 |
| 6,832,784 B1 | * | 12/2004 | Chen | 285/7 |
| 7,025,383 B2 | * | 4/2006 | Canale | 285/7 |
| 7,186,048 B2 | * | 3/2007 | Robins | 403/109.3 |
| 7,293,934 B1 | * | 11/2007 | Huang | 403/109.1 |
| 7,399,260 B1 | * | 7/2008 | Chen | 482/145 |
| 2004/0051302 A1 | * | 3/2004 | Canale | 285/7 |
| 2010/0287999 A1 | * | 11/2010 | Huang | 70/59 |

* cited by examiner

*Primary Examiner* — Victor MacArthur
(74) *Attorney, Agent, or Firm* — Alan Kamrath; Kamrath IP Lawfirm, P.A.

(57) ABSTRACT

An adjustable positioning structure of a shaft member contains an inner tube including a plane having plural holes, an outer tube including a cutout to receive the inner tube, an adjustable positioning device including a fixing seat, and a retaining block formed in a twisted piece shape and axially defined between two extending sides of the fixing seat. The retaining block includes a pressing portion and a bore fixed on one end thereof, and includes a lock tab extending outward from another end thereof. A stop switch is covered by the fixing seat and includes a shoulder to be inserted in the bore to stop the retaining block to be pressed and to operate. An resilient element is defined between the retaining block, and the stop switch to contact with the retaining block, so that the lock tab is retained in one of the holes.

7 Claims, 5 Drawing Sheets

ADJUSTABLE POSITIONING STRUCTURE OF A SHAFT MEMBER

BACKGROUND OF THE INVENTION

1. Field of the Invention

The present invention relates to an adjustable shaft member and, more particularly, to an adjustable positioning structure of the shaft member to be operated safely and easily.

2. Description of the Prior Art

A conventional adjustable shaft member is widely used and includes an inner tube, an outer tube to receive the inner tube, and an adjustable positioning structure to adjust a length of the shaft member and to position the shaft member.

The adjustable positioning structure includes an elastic bar to be retained in one of the holes of the inner tube so that the inner and outer tubes are retained with each other. Since the elastic bar does not include any safe device, it is easy to be contacted by a user carelessly during operation to release an engagement, injuring the user easily.

Besides, when the length of the shaft member is adjusted, the elastic bar has to be pressed, causing an inconvenient operation.

The present invention has arisen to mitigate and/or obviate the afore-described disadvantages.

SUMMARY OF THE INVENTION

The primary object of the present invention is to provide an adjustable positioning structure of the shaft member that includes an adjustable positioning device having a stop switch to be used to stop a pressing portion of a retaining block to be pressed in a normal state to achieve a safe purpose. Thus, the pressing portion of the retaining block is not pressed to release an engagement. Hence, a user will not be injured during operation.

Another object of the present invention is to provide an adjustable positioning structure of the shaft member that when desiring to pull an inner tube to adjust its length and when a lock tab is tilted, the pressing portion of the retaining block is pressed so that the lock tab disengages from a hole of the inner tube, and the inner tube is pulled directly without pressing the retaining block. Thus, the lock tab matches with a resilient element to disengage from the hole of the inner tube to pull the inner tube outward, operating the adjustable positioning structure of the shaft member easily.

To obtain the above objectives, an adjustable positioning structure of the shaft member provided by the present invention contains an inner tube, an outer tube, and an adjustable positioning device. The inner tube includes a plane axially formed on a peripheral side thereof. The plane includes a plurality of holes arranged thereon and spaced apart from each other equally. The outer tube includes a cutout disposed on one end thereof to receive the inner tube. The adjustable positioning device is comprised of a fixing seat, a retaining block, a stop switch, and a resilient element. A cross section of the fixing seat is formed in a U-shape pipe shape to face an outer rim of the one end of the outer tube which includes the cutout. The then fixing seat includes two extending sides. The then retaining block is formed in an elongated Z shape and axially defined between the two extending sides of the fixing seat. The retaining block includes a pressing portion and a bore fixed on one end thereof and includes a tilted lock tab extending outward from another end thereof. The stop switch is formed in a slidable cover shape to be covered to the fixing seat. The stop switch includes a shoulder disposed on one end thereof to be inserted in the bore of the retaining block to stop the retaining block to be pressed and to operate. The resilient element is defined between the retaining block and the stop switch to contact with the retaining block, so that the lock tab of the retaining block is retained in one of the holes.

DETAILED DESCRIPTION OF THE PREFERRED EMBODIMENTS

Figures 1, 2:
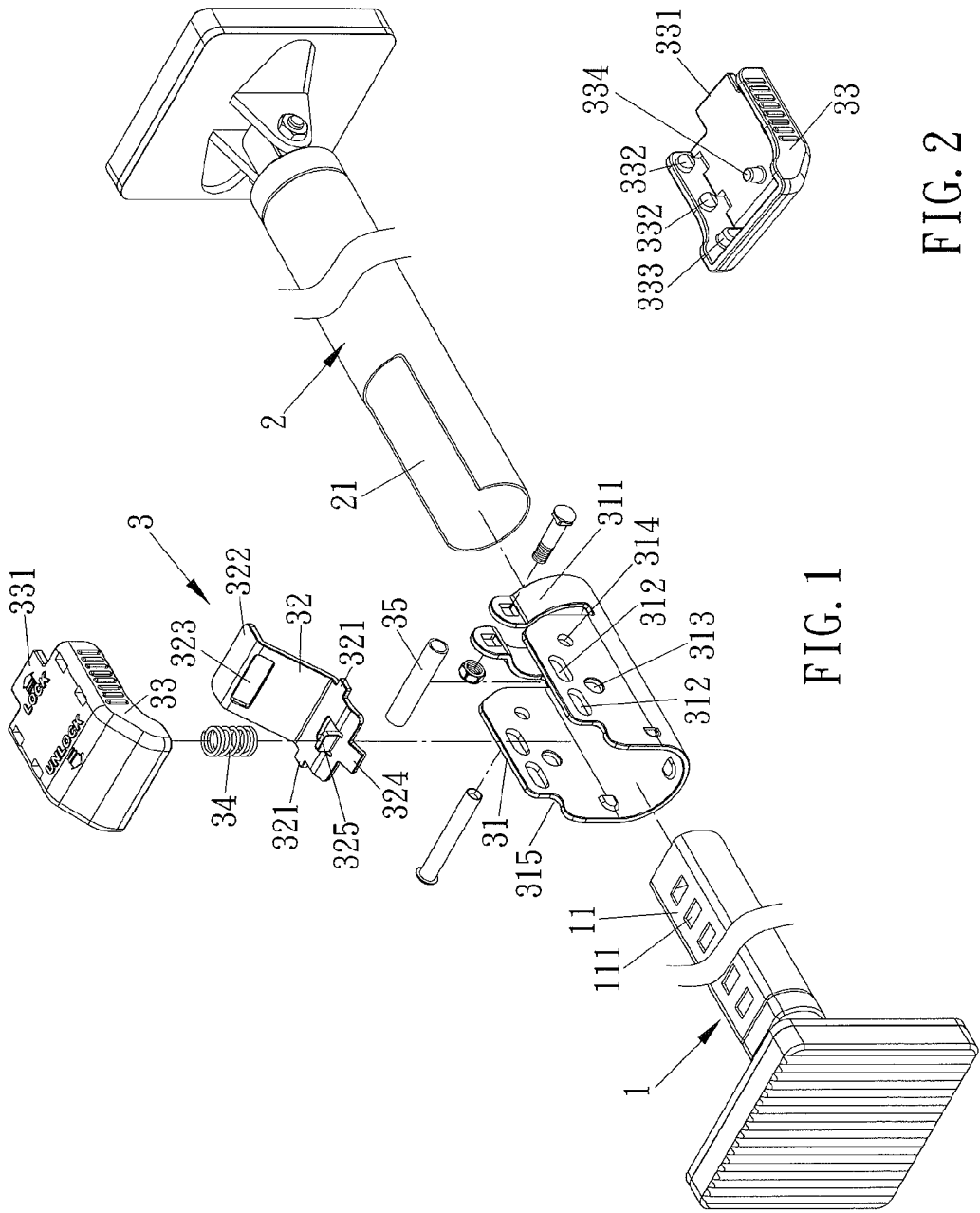
FIG. 1 is a perspective view showing the exploded components of an adjustable positioning structure of a shaft member according to a preferred embodiment of the present invention.
FIG. 2 is a perspective view showing the assembly of a stop switch of the adjustable positioning structure of the shaft member according to the preferred embodiment of the present invention.
Figure 3:
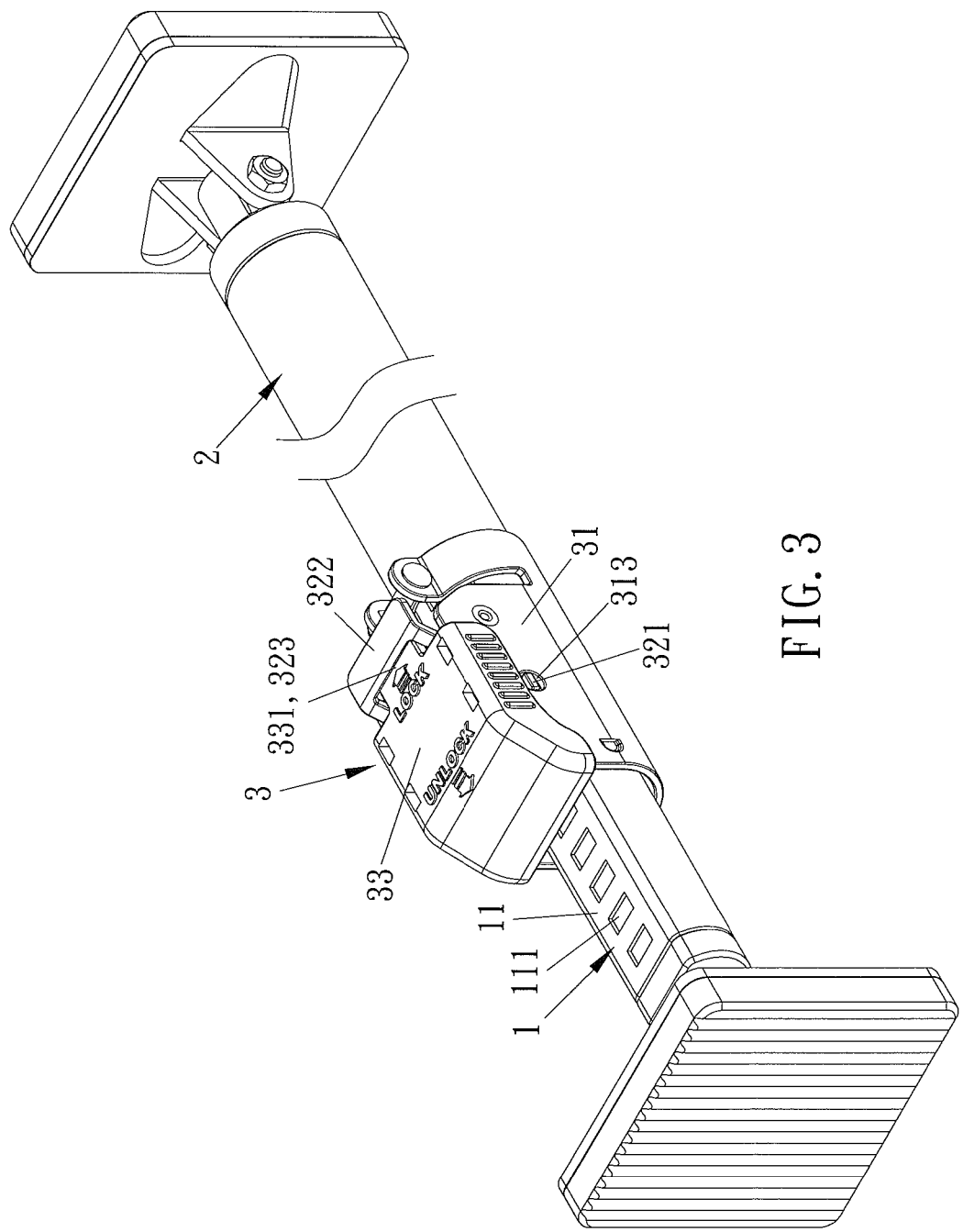
FIG. 3 is a perspective view showing the assembly of the adjustable positioning structure of the shaft member according to the preferred embodiment of the present invention.
Figure 4:
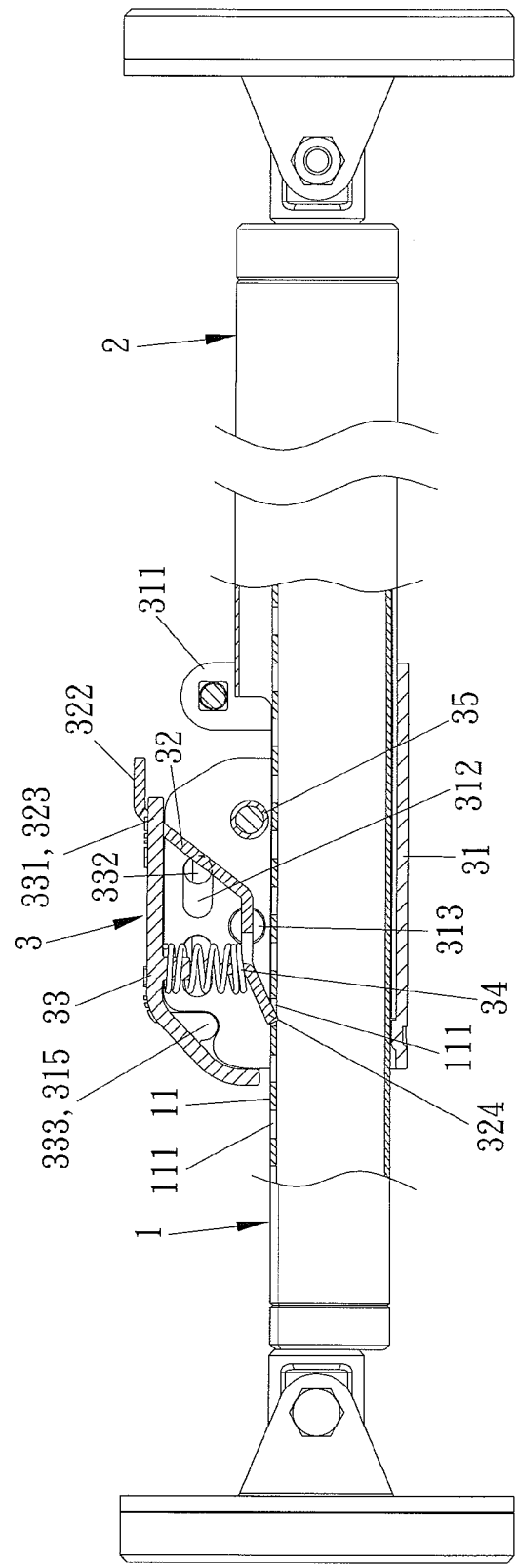
FIG. 4 is a cross sectional view showing the assembly of the adjustable positioning structure of the shaft member according to the preferred embodiment of the present invention.

The present invention will be clearer from the following description when viewed together with the accompanying drawings, which show, for purpose of illustration only, the preferred embodiment in accordance with the present invention.

With reference to FIGS. 1-4, an adjustable positioning structure of a shaft member according to a preferred embodiment of the present invention comprises an inner tube 1, an outer tube 2, and an adjustable positioning device 3. The inner tube 1 includes a plane 11 axially formed on a peripheral side thereof. The plane 11 includes a plurality of holes 111 arranged thereon and spaced apart from each other equally. The outer tube 2 is used to receive the inner tube 1 and includes a cutout 21 corresponding to the plane 11 of the inner tube 1. The adjustable positioning device 1 is comprised of a fixing seat 31, a retaining block 32, a stop switch 33, a resilient element 34, and a limiting bolt 35. A cross section of the fixing seat 31 is formed in a U-shape pipe shape to face to an outer rim of one end of the outer tube 2 which includes the cutout 21. The fixing seat 31 includes two extending sides and a C-shaped engaging portion 311 disposed on one end thereof to match with a locking element and to be positioned in the cutout 21 of the outer tube 2. Each extending side of the fixing seat 31 includes an elongated orifice 312, an axial bore 313, an aperture 314, and a concave recess 315 formed on one end thereof away from the engaging portion 311. The retaining block 32 is formed in an elongated Z shape includes an axial stem 321 extending outward from two sides of a middle section thereof to be inserted in the axial bores 313 of the two extending sides of the fixing seat 31. The retaining block 32 includes a pressing portion 322 and a horizontally elongated bore 323 fixed on one end thereof. The retaining block 32 further includes a tilted lock tab 324 extending outward from another end thereof and a fitting projection 325 extending upward. The stop switch 33 is formed in a slidable cover shape to be covered by the fixing seat 31. The stop switch 33 includes a shoulder 331 disposed on one end thereof to be inserted in the bore 323 of the retaining block 32 to stop the retaining block 32 to be pressed and to operate, thus preventing the retaining block 32 from disengagement. In addition, the stop switch 33 includes two defining protrusions 332 fixed on an inner surface of each of two sides thereof to be retained in the elongated orifice 312 of the fixing seat 31. The stop switch 33 is limited to move in a certain range, includes an extension 333 disposed on one end of each of two sides thereof. Specifically, the stop switch 33 includes an insertion 334 extending upward on a top surface thereof, such that the extension 333 is locked in the concave recess 315 of the fixing seat 31 to position the stop switch 33. The resilient element 34 is a spring to be defined between the retaining block 32 and the stop switch 33. The resilient element 34 includes two ends to be fitted with the fitting projection 325 of the retaining block 32 and the insertion 334 of the stop switch 33 individually to generate a compressing force so that the retaining block 32 is abutted against the plane 11 of the inner tube 1. The lock tab 324 of the retaining block 32 is retained in one suitable of the holes 111 to stop the inner tube 1 to displace in the outer tube 2. The limiting bolt 35 is inserted between the apertures 314 of the extending sides of the fixing seat 31 to obtain a limiting effect.

Figure 5:
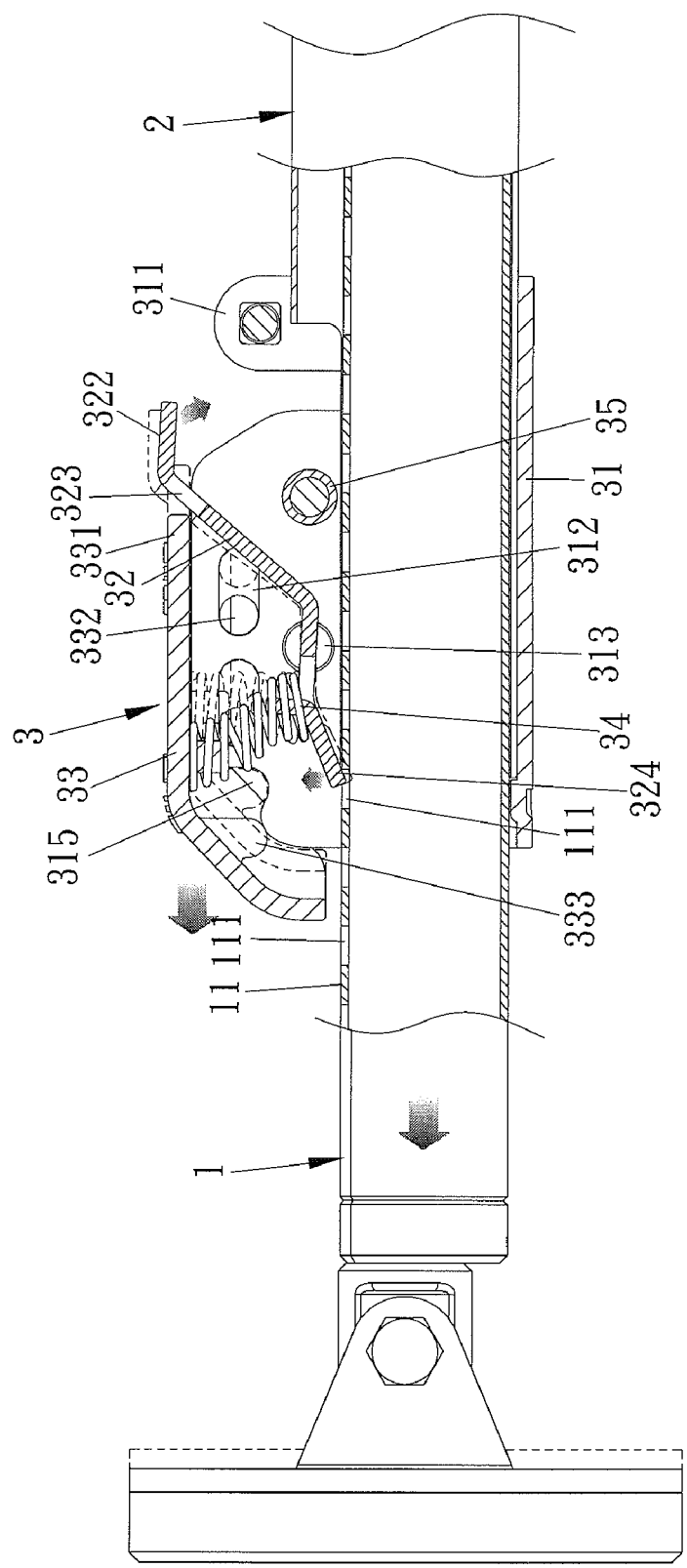
FIG. 5 is a cross sectional view showing the operation of the adjustable positioning structure of the shaft member according to the preferred embodiment of the present invention.

When desiring to pull the inner tube 1, as shown in FIG. 5, the stop switch 33 is pushed toward the pressing portion 322 of the retaining block 32. Thus, the extension 333 of the stop switch 33 disengages from the concave recess 315 of the fixing seat 31, and the shoulder 331 of the stop switch 33 disengages from the bore 323 of the retaining block 32 to release the retaining block 32 so that the pressing portion 322 of the retaining block 32 is pressed, and the lock tab 324 disengages from the hole 111 of the inner tube 1 to pull the inner tube 1. Furthermore, when the retaining block 32 is not pressed, the inner tube 1 is pulled outward directly, and the tilted lock tab 324 cooperates with the resilient element 34 to disengage from the hole 111 of the inner tube 1, thereby pulling the inner tube 1.

Figure 6:
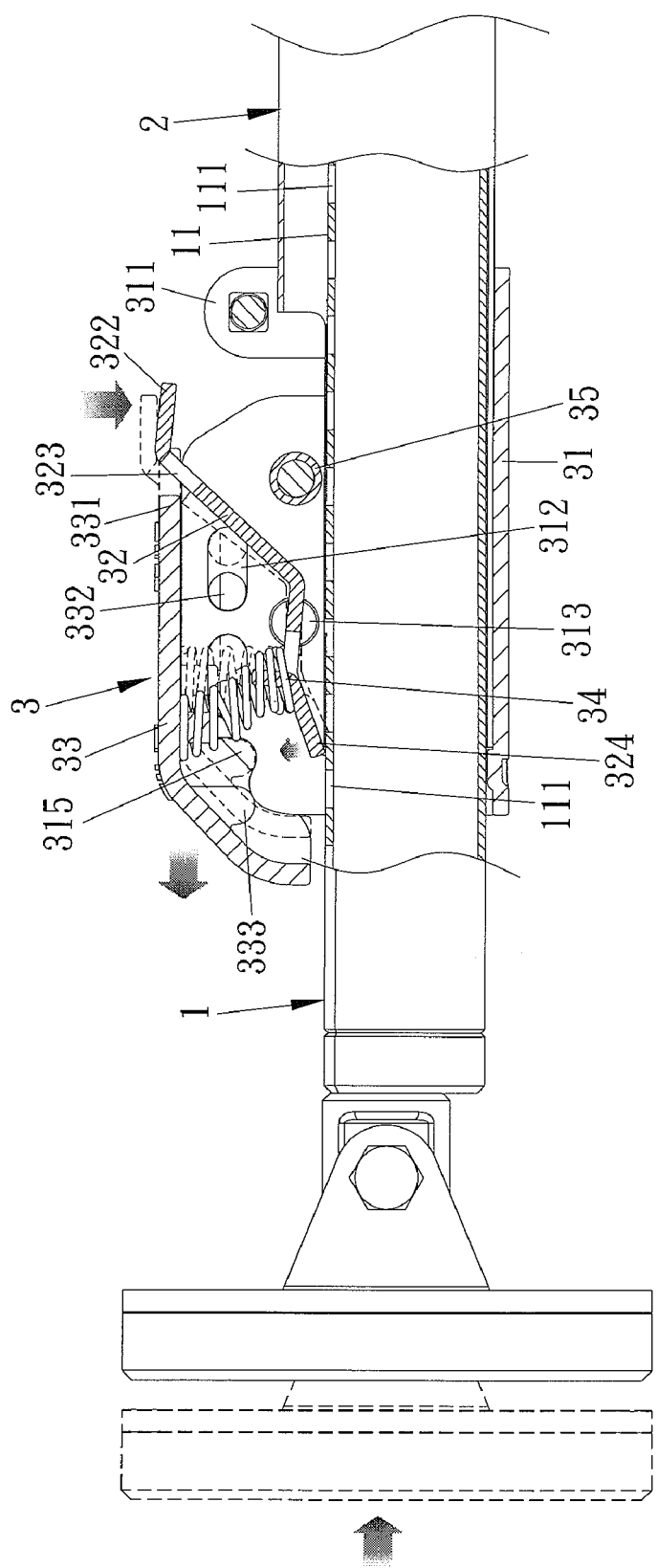
FIG. 6 is another cross sectional view showing the operation of the adjustable positioning structure of the shaft member according to the preferred embodiment of the present invention.

When desiring to retract the inner tube 1, as shown in FIG. 6, the stop switch 33 is pushed toward the pressing portion 322 of the retaining block 32. Thus, the extension 333 of the stop switch 33 disengages from the concave recess 315 of the fixing seat 31, and the shoulder 331 of the stop switch 33 disengages from the bore 323 of the retaining block 32 to release the retaining block 32 so that the pressing portion 322 of the retaining block 32 is pressed. Hence, the lock tab 324 disengages from the holes 111 of the inner tube 1 to retract the inner tube 1, thus adjusting the shaft member toward a desired length.

Thereby, the adjustable positioning structure of the shaft member of the present invention has the following advantages:

1. The adjustable positioning device includes the stop switch 33 to be used to stop the pressing portion 322 of the retaining block 32 to be pressed in a normal state to achieve a safe purpose. Thus, the pressing portion 322 of the retaining block 32 is not pressed to release the engagement. Hence, a user will not be injured during operation.

2. When desiring to pull the inner tube 1 to adjust its length and when the lock tab 324 is tilted, the pressing portion 322 of the retaining block 32 is pressed. Thus, the lock tab 324 disengages from the hole 111 of the inner tube 1, and the inner tube 1 is pulled directly without pressing the retaining block 32, such that the lock tab 324 matches with the resilient element 34 to disengage from the hole 111 of the inner tube 1 to pull the inner tube 1 outward, operating the adjustable positioning structure of the shaft member easily.

While various embodiments in accordance with the present invention have been shown and described, it is clear to those skilled in the art that further embodiments may be made without departing from the scope of the present invention.

What is claimed is:

1. A shaft member comprising an inner tube, an outer tube, and an adjustable positioning device, wherein the inner tube includes a plane axially formed on a peripheral side thereof, wherein the plane includes a plurality of holes arranged thereon and spaced apart from each other equally, wherein the outer tube includes a cutout disposed on one end thereof to receive the inner tube, wherein the adjustable positioning device includes a fixing seat, a retaining block, a stop switch, and a resilient element, wherein a cross section of the fixing seat is formed in a U-shape pipe shape to face to an outer rim of the one end of the outer tube which includes the cutout, wherein the fixing seat includes two extending sides, wherein the retaining block is formed in an elongated Z shape and is axially defined between the two extending sides of the fixing seat, wherein the retaining block includes a pressing portion and a bore fixed on one end thereof, wherein the retaining block further includes a lock tab extending outward from another end thereof, wherein the stop switch is formed in a slidable cover shape to be covered to the fixing seat, wherein the stop switch includes a shoulder disposed on one end thereof to be inserted in the bore of the retaining block to stop the retaining block to be pressed and to operate, wherein the resilient element is defined between the retaining block and the stop switch to contact with the retaining block and the stop switch, wherein the lock tab of the retaining block is retained in one of the plurality of holes.

2. The shaft member as claimed in claim 1, wherein each extending side of the fixing seat includes an elongated orifice parallel to the inner and outer tubes and an axial bore perpendicular to the inner and outer tubes, wherein the retaining block includes an axial stem extending outward from two sides of a middle section thereof and inserted in the axial bores of the two extending sides of the retaining block, wherein the stop switch has U-shaped cross sections and includes the top and two sides extending from opposite sides of the top, with the retaining block located intermediate the outer tube and the top and intermediate the two sides of the stop switch, wherein the stop switch includes two defining protrusions fixed on an inner surface of each of the two sides thereof and retained in the elongated orifice of the fixing seat to allow slideable movement of the stop switch parallel to the inner and outer tubes, and wherein the stop switch is limited to slide in a certain range.

3. The shaft member as claimed in claim 1, wherein the adjustable positioning device includes a limiting bolt inserted between the two extending sides of the fixing seat.

4. The shaft member as claimed in claim 1, wherein the fixing seat includes a C-shaped engaging portion disposed on one end thereof to match with a locking element and positioned in the cutout of the outer tube.

5. The shaft member as claimed in claim 1, wherein each extending side of the fixing seat includes a concave recess formed on one end thereof, wherein the stop switch includes an extension disposed on one end of each of two sides thereof and locked in the concave recess of the fixing seat to position the stop switch.

6. The shaft member as claimed in claim 1, wherein the retaining block includes a fitting projection extending upward, wherein the stop switch includes an insertion extending upward on a top surface thereof, and wherein two ends of the resilient element are fitted with the fitting projection of the retaining block and the insertion of the stop switch individually.

7. The shaft member as claimed in claim 1, wherein the lock tab is tilted.

* * * * *